(12) United States Patent
Eizips

(10) Patent No.: US 7,451,409 B2
(45) Date of Patent: Nov. 11, 2008

(54) EMBEDDED USER INTERFACE SYSTEM AND METHOD FOR A MOBILE COMMUNICATION DEVICE

(75) Inventor: Daniel David Eizips, Sunnyvale, CA (US)

(73) Assignee: IXI Mobile (R & D), Ltd. (IL)

( * ) Notice: Subject to any disclaimer, the term of this patent is extended or adjusted under 35 U.S.C. 154(b) by 11 days.

(21) Appl. No.: 10/913,642

(22) Filed: Aug. 5, 2004

(65) Prior Publication Data

US 2006/0031769 A1   Feb. 9, 2006

(51) Int. Cl.
    G06F 3/00 (2006.01)
(52) U.S. Cl. .................. 715/856; 715/740; 715/864
(58) Field of Classification Search .............. 715/856, 715/470, 864
    See application file for complete search history.

(56) References Cited

U.S. PATENT DOCUMENTS

| | | | |
|---|---|---|---|
| 5,481,265 A * | 1/1996 | Russell | 341/22 |
| 5,943,042 A * | 8/1999 | Siio | 345/172 |
| 6,285,354 B1 * | 9/2001 | Revis | 345/163 |
| 6,694,391 B2 * | 2/2004 | Blood | 710/62 |
| 7,007,238 B2 * | 2/2006 | Glaser | 715/765 |
| 2002/0094872 A1 * | 7/2002 | Yamada | 463/43 |
| 2004/0041787 A1 * | 3/2004 | Graves | 345/157 |
| 2004/0176140 A1 * | 9/2004 | Nishino et al. | 455/566 |
| 2004/0214562 A1 * | 10/2004 | Adan et al. | 455/420 |
| 2005/0275619 A1 * | 12/2005 | Kao | 345/156 |
| 2006/0077624 A1 * | 4/2006 | Lin | 361/681 |

\* cited by examiner

*Primary Examiner*—Sy D Luu
(74) *Attorney, Agent, or Firm*—Century IP Group, Inc.; F. Jason Far-hadian, Esq.

(57) ABSTRACT

A method of remotely controlling a pointing device on a computing system is provided. The method comprises establishing a communication connection between a mobile device and the computing system; and activating a first mode wherein user interaction with a user interface of the mobile device results in communication of instructions to the computing device to control the pointing device in accordance with said user interaction.

15 Claims, 3 Drawing Sheets

EMBEDDED USER INTERFACE SYSTEM AND METHOD FOR A MOBILE COMMUNICATION DEVICE

BACKGROUND

1. Field of Invention

The present invention relates generally to mobile communication systems and, more particularly, to an embedded system and method in a mobile communication device for emulation of a user interface device.

2. Copyright & Trademark Notices

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

3. Related Art

Mobile computing systems, such as laptop computers, have paved the way for many computer users to work more efficiently away from the office. Despite of the convenience associated with the portability of mobile computing systems, such systems typically do not provide the full features of a desktop computer.

For example, point and select devices in laptop computers are usually limited to touch pad or joystick type devices that are integrated into the keyboard of the laptop computers. These integrated devices are not as comfortable to use and lack the precision afforded by a non-integrated device, such as a mouse. Therefore, many users prefer to carry a separate mouse device that would connect to the laptop through a wired or wireless communication port.

Carrying a separate mouse is inconvenient because users often forget to carry the mouse, or the associated connecting cable or transmitter. Besides, users will also have to find additional space in their luggage or briefcase to fit the mouse and the related equipment.

A system or method is desirable that can overcome the above-noted shortcomings.

SUMMARY

The present invention is directed to a system and corresponding methods for embedding a point and select user interface device in a mobile communication device.

For purposes of summarizing, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

In one embodiment, a method of remotely controlling a pointing device on a computing system is provided. The method comprises establishing a communication connection between a mobile device and the computing system; and activating a first mode wherein user interaction with a user interface of the mobile device results in communication of instructions to the computing device to control the pointing device in accordance with said user interaction.

In an exemplary embodiment, the communication connection is established over a wireless communication protocol and the mobile device is a cellular telephone comprising a wireless transceiver for establishing a wireless communication connection with the computing system. The user interface of the mobile device may comprise a control mechanism for controlling movement of the pointing device on the computing system.

In certain embodiments, the control mechanism comprises one or more keys on a keypad of the mobile device, wherein at least one of said keys simulates the function of a mouse button to manipulate a display item on the computing system. In other embodiments, the control mechanism comprises a joystick type device or a wheel-shaped control device. The mobile device may alternatively comprises a tracking device for determining movement of the mobile device with respect to a surface area. The tracking device can comprises a track ball or an optical sensor.

In accordance with another aspect of the invention, a control mechanism embedded in a mobile communication device is provided. The control mechanism comprises first means for remotely controlling a pointing device displayed on a computing system in response to user interaction with the mobile communication device's user interface; and second means for establishing a communication connection between the mobile communication device and the computing system, wherein instructions for controlling the pointing device are generated in response to the user interaction with the user interface and the instructions are transmitted to the computing system over the communication connection established between the mobile communication device and the computing system.

The instructions are generated in response to the user interaction with the user interface, when mobile communication device is in a first mode. The first means comprises logic code for interpreting user interaction with the user interface to generate the instructions for controlling the pointing device. The second means comprises a wireless transceiver or a data cable, or both, depending on implementation.

In one embodiment, the control mechanism further comprises a third means for determining movement of the mobile communication device with respect to a surface area. The third means may comprise a track ball or an optical sensor.

In accordance with another embodiment, a mobile communication device comprises a tracking device for tracking movements of the mobile communication device with respect to a surface area to generate a first signal; logic code for interpreting the first signal to cause a microcontroller to generate instructions for remotely controlling events occurring on a computing system; and a communication port for communicating the instructions to the computing system. Said events comprise at least one of moving and activating a graphic pointer displayed on a screen of the computing system.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION

An electronic system and corresponding methods, according to an embodiment of the present invention, facilitate and provide a method and system for embedding a point and select device in a mobile communication device.

Functions and features provided by the system of this invention, in one or more embodiments, may be provided in a computing system comprising a client/server architecture. Typically, a client/server architecture includes components (e.g., hardware, software, and communication connections) that store and communicate electronic data among various computing systems connected in a network.

In the following, numerous specific details are set forth to provide a thorough description of various embodiments of the invention. Certain embodiments of the invention may be practiced without these specific details or with some variations in detail. In some instances, features not pertinent to the novelty of the system are described in less detail so as not to obscure other aspects of the invention.

Figure 1:
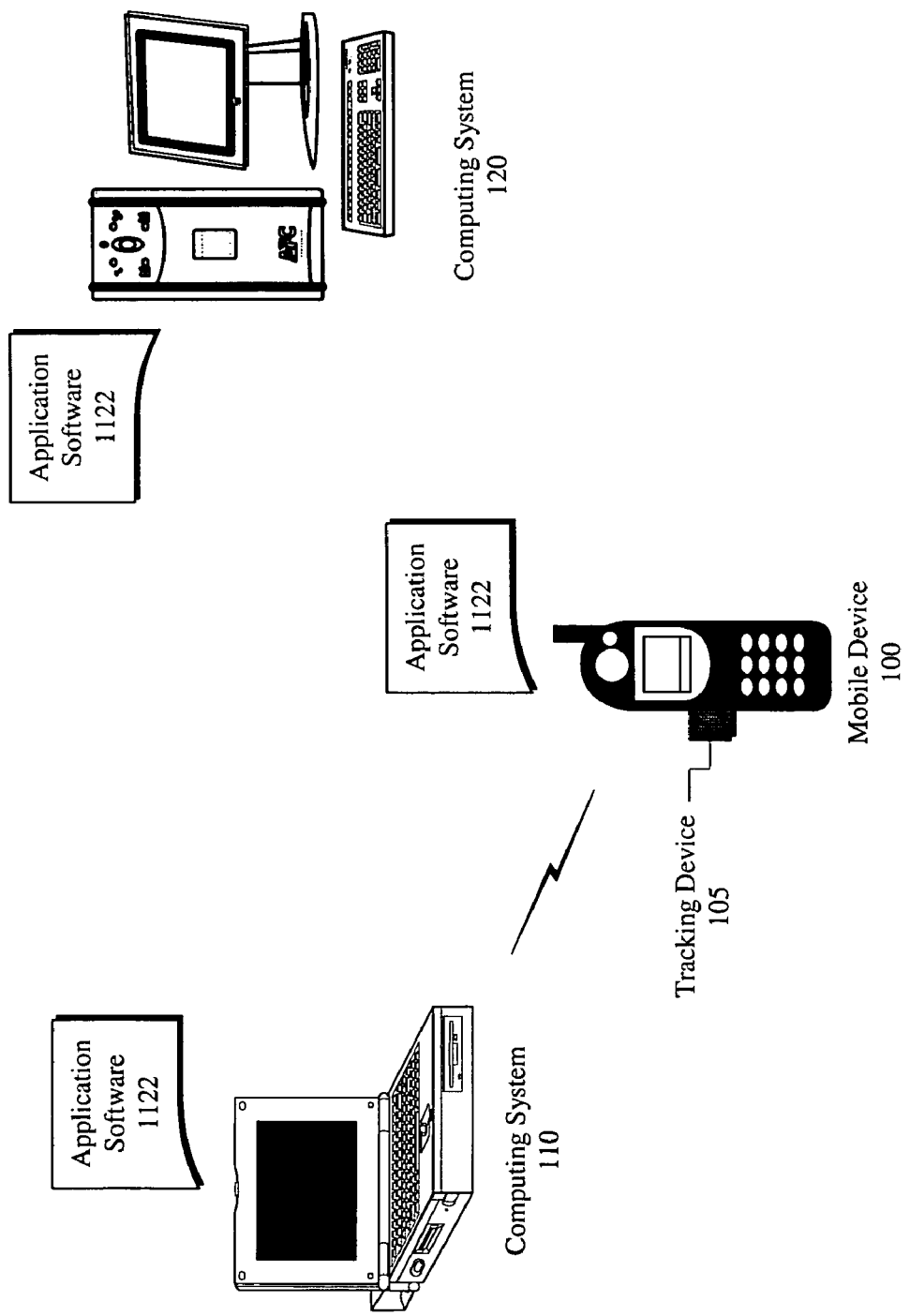
FIG. 1 illustrates an exemplary communications environment in accordance with one or more embodiments of the invention.

Referring to the drawings, FIG. 1 illustrates an exemplary communication environment in which the system of the present invention may operate. In accordance with one aspect of the invention, the system environment comprises a mobile device 100 in communication with one or more computing systems 110 or 120. Mobile device 100 may communicate with computing system 110 by way of a wired connection (e.g., cable) or a wireless connection implemented over a well-known wireless communication protocol (e.g., radio, infrared, switched communication network, radar, cellular, etc.). The terms "connected," "coupled," or any variant thereof, mean any connection or coupling, either direct or indirect, between two or more elements. The coupling or connection between the elements can be physical, logical, or a combination thereof.

In some embodiments, mobile device 100 may be a cellular or cordless telephone that comprises a personal mobile gateway (PMG) device (not shown). Alternatively, mobile device 100 may be a portable communication device configured to communicate with a PMG device for the purpose of establishing a connection with computing systems 110, 120. The PMG architecture comprises a PMG server that can wirelessly communicate with a number of PMG enabled devices within the personal area of the user, thus providing a personal area network (PAN).

A PMG server can wirelessly communicate with remote server systems, such as a mobile communication service provider connected in a wide area network (WAN). Thus, the PMG acts as an interface to seamlessly connect a PAN to a WAN. As such, the devices attached to the PAN or WAN can communicate with each other. A more detailed description of the PMG architecture is provided in U.S. patent application Ser. No. 09/850399, filed on May 7, 2001, the entire content of which is hereby incorporated by reference here.

In one embodiment, mobile device 100 comprises a wireless transceiver to send and receive control signals over a short-range wireless communication protocol, such as Bluetooth. In other embodiments, any type of wired connection or wireless communication protocol may be utilized to establish a connection between computing system 110 and mobile device 100.

In another embodiment, a physical connector (e.g., RS-232 serial cable, USB cable, etc.) may be utilized to directly connect mobile device 100 to computing system 110. In some embodiments, the direct wired connection can be used to also recharge a power source (e.g. battery) connected to mobile device 100. In other embodiments, infrared ports or other wireless communication mechanisms (e.g., IEEE 802.11 chipsets) embedded or installed in mobile device 100 and computing system 110 may be used as a means for wirelessly connecting the two systems in a well-known manner.

Computing systems 110 or 120 may be one of a laptop computer or a desktop computer or any other type of computing system such as a personal digital assistance (PDA), a set-top-box, a smart appliance, or the like. In certain embodiments, application software 1122 is executed on mobile device 100 or computing systems 110, 120 to control and facilitate the establishment of one or more connections between mobile device 100 and at least one of computing devices 110 or 120.

Figure 2:
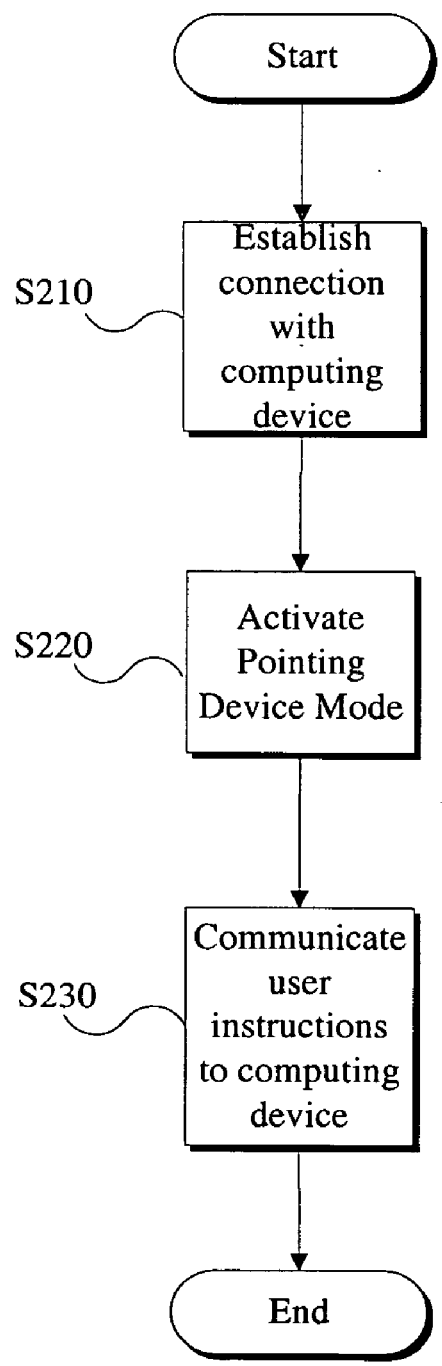
FIG. 2 is a flow diagram of an exemplary method for connecting a mobile device to a computing system to provide point and select instructions, in accordance with one embodiment.

Referring to FIG. 2, when mobile device 100 is connected to computing device 110 (S210), for example, software 1122 either automatically or in response to user input activates a pointing device mode (S220). While mobile device 100 is in the pointing device mode, mobile device 100 can be used as a pointing device by a user to point to, select, and activate items displayed on computing device 110's display. As such, mobile device 100 can be used to communicate point and select instructions to computing device 110 (S230) as provided in further detail below.

Referring back to FIG. 1, mobile device 100 comprises a keypad having push buttons or keys designed to allow a user to dial a number or alternatively input data to manipulate mobile device 100 to perform various functions. In one embodiment, one or more keys on the keypad are designated to act as control buttons for selecting or activating items displayed on computing device 110's display.

For example, in accordance with one or more embodiments, a first key on the upper left corner of mobile device 100 (e.g., the number 1 key) may be designated to function as a left mouse button, when pressed and held. A second key may be also designated, for example, on the upper right corner of mobile device 100 (e.g., the number 3 key) to function as a right mouse button. In alternative embodiments, special keys may be implemented in different positions on the keypad or body of mobile device 100 to perform the same or similar functions when the pointing device mode is active.

That is, a user may press a first key, simulating the left mouse button, in order to select text or graphic content displayed on computing device 110's screen. Pressing a second key, simulating a right mouse button, may respectively provide a user with other corresponding options, for example, associate with a right mouse button. As such, one or more keys on mobile device 100's keypad can be configured to act as mouse buttons for the purpose of selecting or activating content displayed on computing device 110.

In one embodiment, in order to move a pointer displayed on computing device 110, a user may interact with mobile device 100's keypad to transmit instructions indicating the direction of movement of the pointer. For example, in one embodiment, a set of keys on the keypad, such as the number 2, 8, 4 and 6 keys, may be designated as pointing toward a set of directions, such as up, down, left and right, respectively. In other embodiments, additional keys such as the number 1, 9, 3 and 7 keys, may be designated as pointing toward another set of directions, for example, such as upper left, lower right, upper right and lower left, respectively.

Accordingly, a user may press any of the above-designated keys in order to direct the movement of the pointer. Application software 1122 executing on mobile device 100, in one embodiment, monitors the user interaction with the keypad and the length of time each key is pressed or held. When a key (e.g., number 4 key) is pressed and held then application software 1122 communicates instructions to computing system 110 to move the pointer toward a corresponding direction (e.g., left) at a predetermined speed for the duration of the time that the key is pressed.

In certain embodiments, instead of implementing the above scheme, mobile device 100 comprises a wheel-shaped control interface with arrows pointing to first (e.g., up), second (e.g., down), third (e.g., right) and fourth (e.g., left) directions, for example. When the pointing device mode is not activated, pressing the wheel-shaped control interface arrows in the various directions allows a user to browse through the multi-level user interface menus implemented for mobile device 100.

In the above embodiment, when pointing device mode is activated, pressing on the wheel-shaped control interface arrows allows a user to move a pointer displayed on computing system 110 in accordance with the direction assigned to each arrow. For example, pressing the top portion of the wheel-shaped interface results in application 1122 sending instruction to computing device 110 to move the pointer toward the upper portion of the screen. Or, pressing on the lower left portion of the wheel-shaped interface, results in the pointer moving toward the lower left portion of the screen. As such, each corner of the wheel-shaped interface corresponds with a direction of travel with respect to which the pointer would move when a user presses that corner.

One skilled in the art can contemplate other user interface mechanisms embedded on mobile device 100 that can be configured to operate in a manner similar to that provided above. For example, certain mobile devices comprise a joystick type mechanism used for menu browsing purposes. Application software 1122 may be configured to recognize user interaction with the joystick type mechanism as selection and movement instructions for controlling a pointer on computing system 110.

In alternative embodiments, mobile device 100 may comprise a mechanical or optical tracking device 105. For example, a trackball may be installed in the back portion of mobile device 100 or on the side, as shown in FIG. 1, to measure and monitor the movement of mobile device 100 with respect to a designated surface (e.g., a mouse pad). In another embodiment, an optical sensor (e.g., Agilent ADNS-2030) in combination with an illumination source (e.g., HLMP-ED80 LED) may be embedded in mobile device 100 to track movement based on measuring the light emitted from the illumination source.

Other movement tracking mechanisms based on other technologies may be also implemented and embedded in mobile device 100 to perform the above-defined tracking functions. In an exemplary embodiment, mobile device 100 comprises a camera unit and an illumination source, wherein application software 1122 controls the camera's operation to measure light resulting from the movement of mobile device 100. These measurements are then converted to signals that are processed and interpreted by application software 1122 to generate instructions for controlling the movement and positioning of a pointer displayed on computing system 110.

As used herein, the terms mobile device, computing system and tracking device are to be viewed as designations of one or more computing environments that comprise application, client or server software for servicing requests submitted by respective software included in devices or other computing systems connected thereto. These terms are not to be otherwise limiting in any manner.

Exemplary embodiments provided herein are not to be construed to limit the scope of the invention to application software 1122 that executes exclusively on mobile device 100. Application software 1122 may be implemented on a device or a system other than mobile device 100. For example, application software 1122 or its components may be implemented, installed, and executed either in a singular or in a distributed environment comprising mobile device 100, computing systems 110, 120, tracking device 105 or other systems attached thereto.

In embodiments of the system, computing systems 110, 120 and mobile device 100 comprise a controlled computing system environment that can be presented largely in terms of hardware components and software code executed to perform processes that achieve the results contemplated by the system of the present invention. A more detailed description of such system environment is provided below with reference to FIGS. 3A and 3B.

As shown, a computing system environment is composed of two environments, a hardware environment 1110 and a software environment 1120. The hardware environment 1110 comprises the machinery and equipment that provide an execution environment for the software. The software provides the execution instructions for the hardware. It should be noted that certain hardware and software components may be interchangeably implemented in either form, in accordance with different embodiments.

Software environment 1120 is divided into two major classes comprising system software 1121 and application software 1122. System software 1121 comprises control programs, such as the operating system (OS) and information management systems that instruct the hardware how to function and process information.

Application software 1122 is a program that performs a specific task, such as monitoring movements of a tracking device. In embodiments of the invention, application software 112 is implemented and executed on one or more hardware environments to track movements of mobile device 100, or monitor user interaction with mobile device 100 keypad, to generate instructions for controlling the movement of a pointer on computing system 110, and to select and activate items displayed thereon.

Figure 3A:
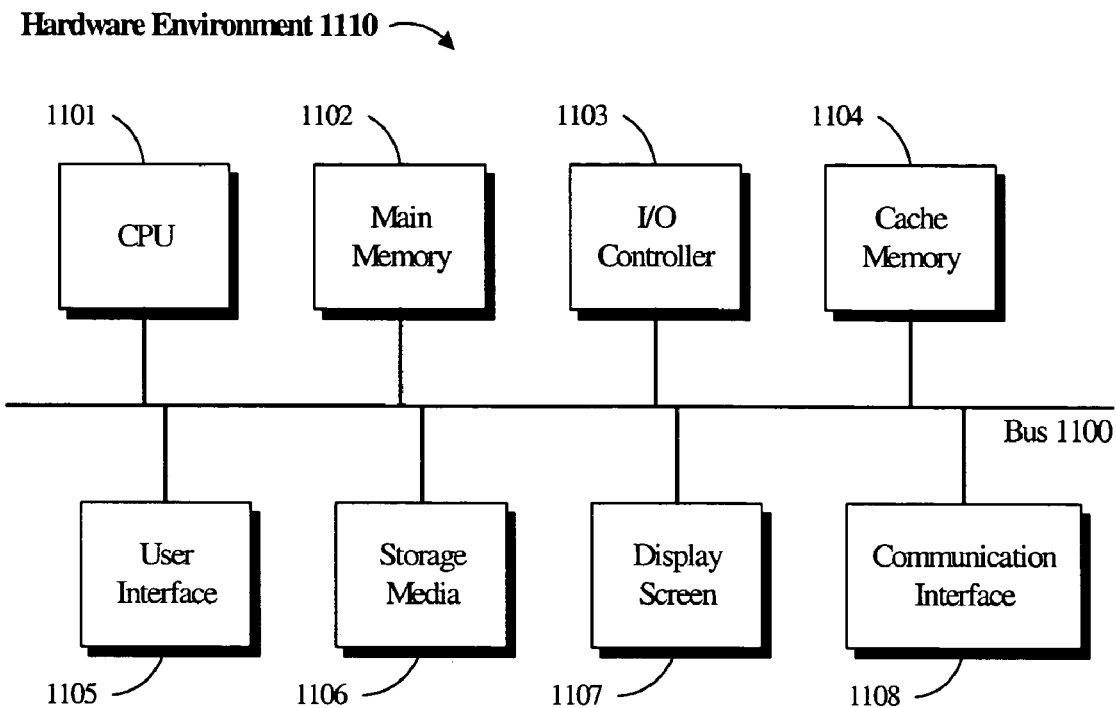
FIGS. 3A and 3B are block diagrams of hardware and software environments in which a system of the present invention may operate, in accordance with one or more embodiments.

Referring to FIG. 3A, an embodiment of application software 1122 can be implemented as computer software in the form of computer readable code executed on a general purpose hardware environment 1110 that comprises a central processor unit (CPU) 1101, a main memory 1102, an input/output controller 1103, optional cache memory 1104, a user interface 1105 (e.g., keypad, pointing device, etc.), storage media 1106 (e.g., hard drive, memory, etc.), a display screen 1107, a communication interface 1108 (e.g., a network card, a modem, or a wireless communication chipset), and a system synchronizer (e.g., a clock, not shown in FIG. 3A).

Processor 1101 may or may not include cache memory 1104 utilized for storing frequently accessed information. A communication mechanism, such as a bi-directional data bus 1100, can be utilized to provide for means of communication between system components. Hardware Environment 1110 is capable of communicating with local or remotes systems connected to a communications network (e.g., a PAN or a WAN) through communication interface 1108.

In one or more embodiments, hardware environment 1110 may not include all the above components, or may include additional components for additional functionality or utility. For example, hardware environment 1110 can be a laptop computer or other portable computing system that can send messages and receive data through communication interface 1108. Hardware environment 1110 may also be embodied in an embedded system such as a set-top box, a personal data assistant (PDA), a wireless communication unit (e.g., cellular phone), or other similar hardware platforms that have information processing and/or data storage and communication capabilities. For example, in embodiments of the system, mobile device 100 may be a PMG phone or equivalent.

In one embodiment, communication interface 1108 can send and receive electrical, electromagnetic, or optical signals that carry digital data streams representing various types of information including program code. If communication is established via the Internet, hardware environment 1110 may transmit program code through an Internet connection. The program code can be executed by central processor unit 1101 or stored in storage media 1106 or other non-volatile storage for later execution.

Program code may be transmitted via a carrier wave or may be embodied in any other form of computer program product. A computer program product comprises a medium configured to store or transport computer readable code or a medium in which computer readable code may be embedded. Some examples of computer program products are CD-ROM disks, ROM cards, floppy disks, magnetic tapes, computer hard drives, and network server systems.

In one or more embodiments of the invention, processor 1101 is a microprocessor manufactured by Texas Instruments, Qualcomm, Motorola, Intel, or Sun Microsystems Corporations. The named processors are for the purpose of example only. Any other suitable microprocessor, microcontroller, or computing chipset may be utilized.

Figure 3B:
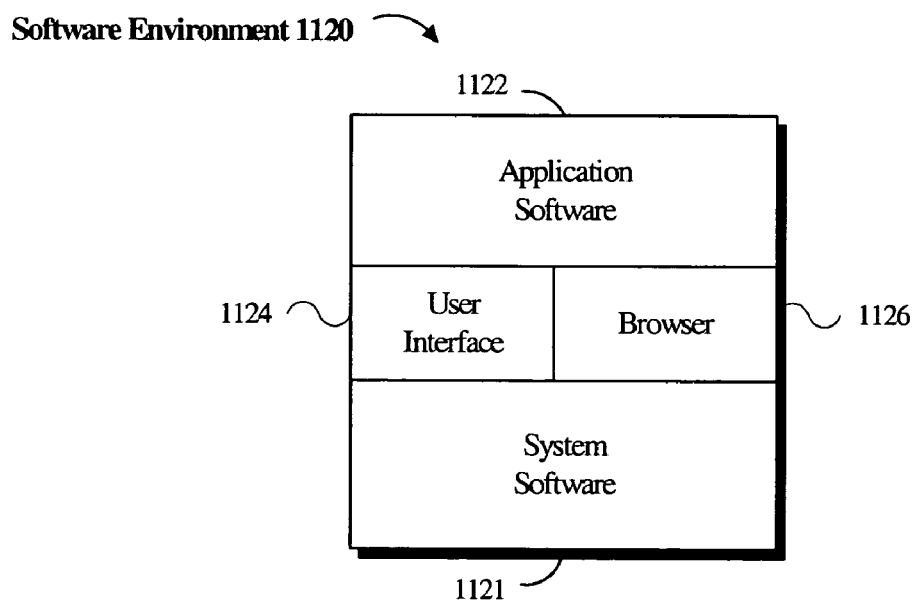

Referring to FIG. 3B, software environment 1120 is stored in storage media 1106 and is loaded into memory 1102 prior to execution. Software environment 1120 comprises system software 1121 and application software 1122. Depending on system implementation, certain aspects of software environment 1120 can be loaded on one or more hardware environments 1110.

System software 1121 comprises control software such as an operating system that controls the low-level operations of hardware environment 1110. Low-level operations comprise the management of the system's resources such as memory allocation, file swapping, and other core computing tasks. In one or more embodiments of the invention, the operating system comprises at least one of Symbian, Nucleus, Microsoft Windows, Palm, or Macintosh operating systems. However, any other suitable operating system may be utilized.

Application software 1122 can comprise one or more computer programs that are executed on top of system software 1121 after being loaded from storage media 1106 into memory 1102. In a client-server architecture, application software 1122 may comprise client software and server software. Referring to FIG. 1 for example, in one embodiment of the invention, client software is executed on mobile device 100 and server software is executed on computing systems 110 or 120.

Software environment 1120 may also comprise web browser software 1126 for communicating with the Internet.

Further, software environment 1120 may comprise a user interface 1124 (e.g., a Graphical User Interface (GUI)) for receiving user commands and data. The commands and data received are processed by the software applications that run on the hardware environment 1110. The hardware and software architectures and environments described above are for purposes of example only. Embodiments of the invention may be implemented in any type of system architecture or processing environment.

Embodiments of the invention are described by way of example as applicable to systems and corresponding methods that facilitate tracking user input to mobile device 100. In this exemplary embodiment, logic code for performing these methods is implemented in the form of, for example, application software 1122. The logic code, in one embodiment, may be comprised of one or more modules that execute on one or more processors in a distributed or non-distributed communication model.

It should also be understood that the programs, modules, processes, methods, and the like, described herein are but an exemplary implementation and are not related, or limited, to any particular computer, apparatus, or computer programming language. Rather, various types of general-purpose computing machines or devices may be used with logic code implemented in accordance with the teachings provided, herein. Further, the order in which the steps of the present method are performed is purely illustrative in nature. In fact, the steps can be performed in any order or in parallel, unless indicated otherwise in the present disclosure.

The method of the present invention may be performed in either hardware, software, or any combination thereof. In particular, the present method may be carried out by software, firmware, or macrocode operating on a computer or computers of any type. Additionally, software embodying the present invention may comprise computer instructions and be stored in a recording medium (e.g., memory stick, ROM, RAM, magnetic media, punched tape or card, compact disk (CD), DVD, etc.). Furthermore, such software may be transmitted in the form of a computer signal embodied in a carrier wave, and through communication networks by way of Internet portals or websites, for example. Accordingly, the present invention is not limited to any particular platform, unless specifically stated otherwise in the present disclosure.

The present invention has been described above with reference to preferred embodiments. However, those skilled in the art will recognize that changes and modifications may be made in these preferred embodiments without departing from the scope of the present invention.

The embodiments described above are to be considered in all aspects as illustrative only and not restrictive in any manner. Thus, other system architectures, platforms, and implementations that can support various aspects of the invention may be utilized without departing from the essential characteristics as described herein. These and various other adaptations and combinations of features of the embodiments disclosed are within the scope of the invention. The invention is defined by the claims and their full scope of equivalents.

The invention claimed is:

1. A method of remotely controlling a cursor on a computing system, the method comprising:

establishing a direct communication connection between a mobile device and the computing system, wherein the direct communication connection may be a wired or wireless connection;

monitoring user interaction with one or more keys of the mobile device; and activating a first mode automatically or in response to user interaction, wherein the mobile device can be used to communicate instructions to the computing system to control the cursor, wherein one or more keys are designated for selecting and activating content with the cursor, wherein one or more keys are designated for moving the cursor in a given direction, wherein the length of time that a key is pressed or held is communicated to the computing system, wherein the cursor moves at a predetermined speed for the duration of time that a direction key is pressed or held, wherein a wired connection can also be used to recharge a power source connected to the mobile device.

2. The method of claim 1, wherein at least one of the keys simulates the function of a mouse button to manipulate a display item on the computing system.

3. The method of claim 1, wherein the mobile device comprises a joystick type device.

4. The method of claim 1, wherein the mobile device comprises a wheel-shaped control device.

5. The method of claim 1, wherein the mobile device comprises a tracking device for determining movement of the mobile device with respect to a surface area.

6. The method of claim 5, wherein the tracking device comprises a track ball.

7. The method of claim 5, where in the tracking device comprises an optical sensor.

8. A control mechanism embedded in a mobile device, the control mechanism comprising:

a first means for establishing a direct communication connection between the mobile device and a computing system, wherein the direct communication connection may be a wired or wireless connection;

a second means for monitoring user interaction with one or more keys of the mobile device; and a third means for activating a first mode automatically or in response to user interaction, wherein the mobile device can be used to communicate instructions to the computing system to control a cursor, wherein one or more keys are designated for selecting and activating content with the cursor, wherein one or more keys are designated for moving the cursor in a given direction, wherein the length of time that a key is pressed or held is communicated to the computing system, wherein the cursor moves at a predetermined speed for the duration of time that a direction key is pressed or held, wherein a wired connection can also be used to recharge a power source connected to the mobile device.

9. The control mechanism of claim 8, wherein at least one of the keys simulates the function of a mouse button to manipulate a display item on the computing system.

10. The control mechanism of claim 8, wherein the third means comprises a joystick device.

11. The control mechanism of claim 8, wherein the third means comprises a wheel-shaped control device.

12. The control mechanism of claim 8, wherein the third means comprises a tracking device for determining movement with respect to a surface area.

13. The control mechanism of claim 12, wherein the third means comprises a track ball.

14. The control mechanism of claim 12, wherein the third means comprises an optical sensor.

15. A computer program product comprising a computer useable medium having a computer readable program, wherein the computer readable program when executed on a computer causes the computer to:

establish a direct communication connection between a mobile device and a computing system, wherein the direct communication connection may be a wired or wireless connection;

monitor user interaction with one or more keys of the mobile device; and activate a first mode automatically or in response to user interaction, wherein the mobile device can be used to communicate instructions to the computing system to control a cursor, wherein one or more keys are designated for selecting and activating content with the cursor, wherein one or more keys are designated for moving the cursor in a given direction, wherein the length of time that a key is pressed or held is communicated to the computing system, wherein the cursor moves at a predetermined speed for the duration of time that a direction key is pressed or held, wherein a wired connection can also be used to recharge a power source connected to the mobile device.

* * * * *